Figure 1:
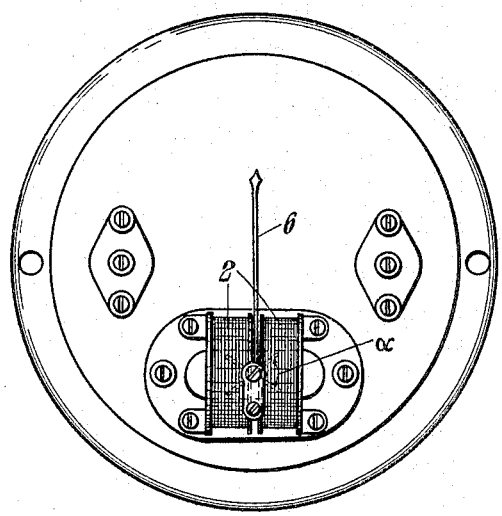
Figure 5:
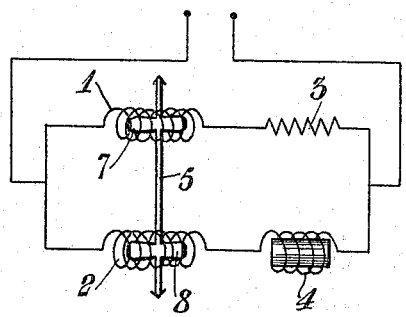

K. R. LILJEBLAD.
ELECTROMAGNETIC FREQUENCY METER AND THE LIKE.
APPLICATION FILED DEC. 1, 1913.

1,168,519. Patented Jan. 18, 1916.

Witnesses:

Inventor:
Karl Ragnar Liljeblad

UNITED STATES PATENT OFFICE.

KARL RAGNAR LILJEBLAD, OF JÄRFVA, NEAR STOCKHOLM, SWEDEN, ASSIGNOR TO AKTIEBOLAGET ELEVATOR, OF JÄRFVA, NEAR STOCKHOLM, SWEDEN.

ELECTROMAGNETIC FREQUENCY-METER AND THE LIKE.

1,168,519.  Specification of Letters Patent.  Patented Jan. 18, 1916.

Application filed December 1, 1913. Serial No. 803,890.

*To all whom it may concern:*

Be it known that I, KARL RAGNAR LILJEBLAD, a subject of the King of Sweden, residing at Järfva, near Stockholm, in the Kingdom of Sweden, have invented new and useful Improvements in Electromagnetic Frequency-Meters and the like, of which the following is a specification, reference being had to the drawing accompanying and forming a part thereof.

This invention relates to an electromagnetic frequency meter or the like, which in any known manner, is provided with two coils, one of said coils being connected in series with an ohmic, non-inductive, resistance, and the other with an inductive resistance. The purpose of having these resistances is that a fluctuation in only the voltage will not cause any change in the relative strength of the magnetic fields of the two coils, while, on the other hand, a fluctuation of the frequency will cause such a change. Heretofore in frequency-meters of this kind, one of the coils is located inside the other in such manner that the fields of the two coils are at right angles to each other, the instrument being provided with only one iron core, which is influenced by the resulting field of the coils. Such instruments, however, are objectionable in many respects. They are comparatively expensive, especially because it is inconvenient to arrange the coils one inside the other. Furthermore they cannot be made sufficiently sensitive without the use of complicated and costly auxiliary devices. Especially on account of the last mentioned circumstance, frequency-meters of this kind have not come into general use.

The object of this invention is to provide an instrument free from the aforenamed objections, and with such object in view each of the coils is provided with a separate core, vane or the like, said cores being secured to a common, freely turning shaft, in such manner that they form an angle with each other. By such arrangement it is possible to place the coils in juxtaposition, for example with the axes parallel or nearly parallel to each other, thereby rendering it easier and cheaper to manufacture such instruments.

By changing the angle between the cores, said cores preferably consisting of soft laminated iron or the like, the instrument can be made highly sensitive for just that particular part of the scale at which it is intended to be used. This feature is, of course, of great importance especially in frequency-meters, which are as a rule used only for relatively slight variation in the frequency.

By combining two such frequency-meters it is possible to obtain a simple and inexpensive synchroscope. For this purpose the instruments are assembled in such manner that the shafts of their pointers or hands are in superposed relation, so that the said pointers, which may, for example, be of different colors, will cover each other when synchronism is achieved.

The accompanying drawing illustrated one form of the invention.

Figure 2:
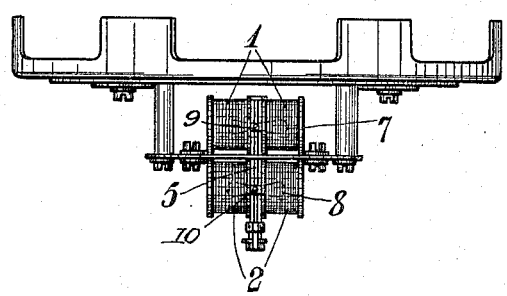
Figure 4:
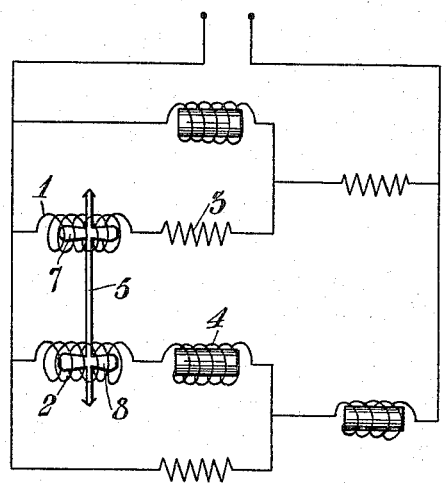

Figure 1 is a front elevation of a frequency-meter embodying the invention; Fig. 2 is a top plan view of the meter; and Figs. 3 and 4 illustrate two different wiring diagrams for the instrument.

The stationary part of the frequency-meter illustrated in the drawing consists of two parallel coils 1 and 2, connected, respectively, to an ohmic resistance 3 and an inductive resistance 4 (see Figs. 3 and 4) so that an increase of the voltage only will not cause any change in the relative strength of the magnetic fields of the coils while an alteration in the frequency will cause such a change.

The simplest and most suitable connection is illustrated in Fig. 3. The current in the coil 1 will remain practically constant irrespective of the frequency of the current, while the current in the coil 2 changes in approximately an inverse ratio to the frequency. To obtain greater sensitiveness of the instrument, which, however, considering the construction of the movable part of the instrument should in most cases be unnecessary, other more complicated connections may be used, which, at a certain change (of the frequency, will cause a greater relative change) in the currents of the coils and hence in the magnetic fields set up thereby. Such a connection is illustrated in Fig. 4. The resistances 3 and 4 are preferably placed within the instrument.

The movable part of the instrument consists of a shaft 5 freely turning in two pivot-bearings and supporting the pointer 6 of the instrument and also two vanes 7 and 8 of soft, thin sheet-iron, one in each of the coils 1 and 2. These parts are carefully balanced. The vanes are secured to the shaft 5, so that they form an angle between themselves of, for example, 75°. It is obvious that if current is supplied only to the coil 1, the vane 7 will take a position in the longitudinal direction of the coil. If current is supplied to the coil 2 only, the other vane 8 will take similar position. If current is fed to both coils, the shaft 5 will take an inter-mediate position, which is dependent on the frequency but evidently is independent of the voltage. By having the inductive resistance constructed with low saturation of the iron and a large air-gap, an instrument can be obtained, which is from a practical point of view, independent of the voltage even at variations of from 50 to 100%.

One of the greatest advantages of the meter of this invention is that by altering the angle between the vanes 7 and 8, for which purpose they may be adjustably secured to the shaft 5 by means of set screws 9 and 10, and by correspondingly adjusting the resistances 3 and 4, the instrument can be made highly sensitive for just that particular part of the scale at which it is intended to be used, for example, 20 to 30 or 40 to 60 cycles, and nevertheless this "sensitive" part of the scale can be rendered practically uniform. It is apparent that this possibility partly depends on the fact that the instrument becomes more and more sensitive with an increase of the angle between the vanes to nearly 90°. With the vanes arranged at an angle 45° with respect to each other, the movement of the shaft caused by a change in the frequency will be slight, as the moment of one of the coils will be greatly reduced through the movement, while that of the other will increase, whereby new equilibrium is soon attained. The movement about the symmetric position will be quite considerable with the vanes arranged at an angle of approximately 90°, because at this part of the scale the moments of both coils are being changed only very slightly with the turning of the shaft, since both are near their maximum, by reason of which a comparatively great movement is required before equilibrium takes place. At an angle of exactly 90° the equilibrium is indifferent.

Having now described my invention and in what manner it is performed, what I claim and desire to secure by Letters Patent is:—

1. In an electromagnetic frequency-meter, the combination of two coils, an ohmic resistance connected in series with one of said coils, an inductive resistance connected in series with the other of said coils, a vane for each of the coils, and a common, freely turning shaft to which said vanes are secured so as to form an angle between each other.

2. In an electromagnetic frequency-meter, the combination of two coils, an ohmic resistance connected in series with one of said coils, an inductive resistance connected in series with the other of said coils, said coils being placed in juxtaposition with their axes approximately parallel, a vane for each of the coils, and a common, freely turning shaft to which said vanes are secured so as to form an angle between each other.

3. In an electromagnetic frequency-meter, the combination of two coils, an ohmic resistance connected in series with one of said coils, an inductive resistance connected in series with the other of said coils, a vane for each of the coils, and a common, freely turning shaft to which said vanes are adjustably secured so as to form an adjustable angle between each other.

KARL RAGNAR LILJEBLAD.

Witnesses:
 FREDRIK SCHMITSLOW,
 N. PERRYE.